United States Patent [19]

Saito

[11] Patent Number: 5,185,516
[45] Date of Patent: Feb. 9, 1993

[54] CARD-TYPE IC-MOUNTING BOARD

[75] Inventor: Tamio Saito, Tokyo, Japan

[73] Assignee: Nippon Steel Corporation, Tokyo, Japan

[21] Appl. No.: 635,239

[22] Filed: Dec. 28, 1990

[30] Foreign Application Priority Data

Dec. 29, 1989 [JP] Japan .................. 1-341820

[51] Int. Cl.⁵ ............... G06K 5/00; G06K 19/06
[52] U.S. Cl. ............................ 235/380; 235/382; 235/492
[58] Field of Search .............. 235/380, 382, 492, 375

[56] References Cited

U.S. PATENT DOCUMENTS

| | | | |
|---|---|---|---|
| 4,575,621 | 3/1986 | Dreifus | 235/492 |
| 4,766,294 | 8/1988 | Nara et al. | 235/492 |
| 4,849,614 | 7/1989 | Watanabe | 235/380 |
| 4,908,038 | 3/1990 | Mastumura et al. | 235/375 |
| 4,918,631 | 4/1990 | Hara et al. | 235/380 |
| 4,922,308 | 3/1990 | Takahira | 235/492 |
| 4,935,962 | 6/1990 | Austin | 235/380 |
| 5,016,086 | 5/1991 | Inoue et al. | 235/492 |

FOREIGN PATENT DOCUMENTS 63-276686  11/1988  Japan .

OTHER PUBLICATIONS

Nikkei Electronics, Sep. 18, 1989, No. 482 pp. 119-141.

Primary Examiner—Eugene R. LaRoche
Assistant Examiner—Tan Nguyen
Attorney, Agent, or Firm—Cushman, Darby & Cushman

[57] ABSTRACT

A card-type IC-mounting board for detachably setting in a selected type of device, and for controlling predetermined external equipment relating the device. The card-type IC mounting board includes a card-type base plate made of an insulating material of a predetermined size, and an IC-based circuit structure formed on the base plate. The circuit structure includes a microprocessor for execution of predetermined functions to control the external equipment. A first and second discrete region are defined on the base plate, and the circuit structure includes a first circuit section formed on the first region and a second circuit section formed on the second region. The first circuit section includes a microprocessor and an auxiliary circuit, for assisting in the operation of the microprocessor. The second circuit section is for controlling the external equipment in accordance with the microprocessor.

17 Claims, 3 Drawing Sheets

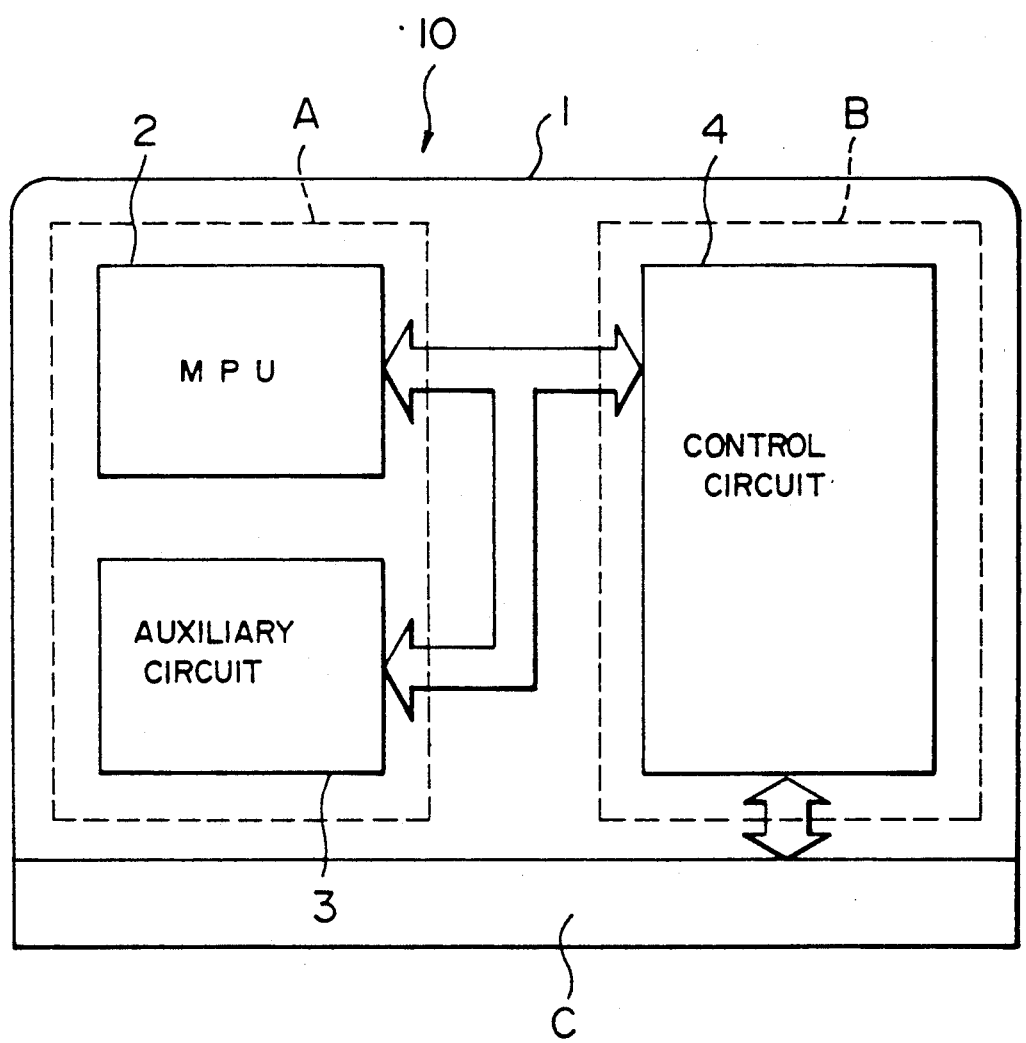
F I G. 1

CARD-TYPE IC-MOUNTING BOARD

BACKGROUND OF THE INVENTION

1. Field of the Invention

The present invention relates to a card-type IC-mounting board and more particularly to a card-type board such as a credit card incorporating IC elements including a microprocessor.

2. Description of the Related Art

Particularly in the area of external memory media of small computer apparatuses, IC-mounting cards called memory cards such as ROM cards and RAM cards have been widely placed in commercial use. Those memory cards have only a memory function. On the other hand, IC cards having CPU function have been developed and studies are under way for the application to cash cards and credit cards issued by financial institutions, and also to the use for ID cards (See "Nikkei Electronics" published by Nikkei BP, Sep. 18, 1989, No. 482, pp 119–141, for example).

However, the conventional IC cards have been made of ICs (LSIs) designed individually for respective uses and functions. For this reason, these IC cards in fact are not applicable to general purpose, resulting in high unit price.

For instance, if an attempt is made to apply a given IC card to different use, it is necessary to do again the whole circuit design, and work out a new IC suitable for the new use. In other words, conventional IC cards need to be produced by a specific production line arranged for an IC chip production process selected for a specific application. Therefore, its mass-productivity is relatively low and as a result, it involves a high production cost.

SUMMARY OF THE INVENTION

To solve the above problem, an object of the present invention is to provide a card-type IC-mounting board having CPU function such that the circuit structure to be mounted on its base plate is divided into a first circuit section which is common to other IC-mounting boards for different uses and a second circuit section which is specific to the IC-mounting board. The base plate is divided into a discrete first and second region where the first and second circuit sections are mounted, respectively, so that the formation of at least the first circuit section on the base plate can be made in mass-production mode.

According to the present invention, in order to achieve the above object, a card-type IC-mounting board, which is adapted to be set detachably in a selected type of device for controlling predetermined external equipment relating to the device, comprises a card-type base plate made of an insulating material of a predetermined size. A discrete first and second region are defined on the base plate. A IC-based circuit structure including a microprocessor for execution of predetermined functions to control the external equipment, the circuit structure comprising a first circuit section, is provided on the first region. The first region further includes the microprocessor and auxiliary circuits for assisting operation of the microprocessor. A second circuit section is provided on the second region for controlling the external equipment on the basis of control of the microprocessor.

According to another aspect of the present invention, a card-type IC-mounting board, which is adapted to be set detachably in a selected type of device for controlling predetermined external equipment relating to the device, comprises a card-type base plate made of an insulating material of a predetermined size; discrete first and second regions defined on the base plate; an IC-based circuit structure including a microprocessor for execution of predetermined functions to control the external equipment, the circuit structure comprising a first circuit section, provided on the first region; the first region further including the microprocessor and auxiliary circuits for assisting operation of the microprocessor; a second circuit section provided on the second region for controlling the external equipment on the basis of control of the microprocessor; and a terminal section mounted on the base plate for connecting the second circuit section to the external equipment.

According to a preferred embodiment of the present invention, the base plate of the card-type IC-mounting board is of a credit card size specified by JIS-X6301-4 Standards.

In the card-type IC-mounting board according to the present invention, the IC-based circuit structure for execution of predetermined functions to control the external equipment is divided into the first circuit section, which is common to other card-type IC-mounting boards for different uses and includes the microprocessor and auxiliary circuits for assisting operation of the microprocessor, and a second circuit section, which is specific to that card-type IC-mounting board for controlling the external equipment on the basis of control of the microprocessor and hence generally required to be designed and produced individually according to its use and functions. The first and second circuit sections are provided on discrete first and second regions defined on the base plate. Therefore, the first circuit section to be formed on the first region can be produced on the same production line together with different kinds of other card-type IC-mounting boards, and the second circuit section specific to that card-type IC-mounting board only is subjected to individual design and production according to its use and functions. This contributes to an improvement in productivity.

BRIEF DESCRIPTION OF THE DRAWINGS

FIG. 1 is a diagram showing the basic arrangement of a card-type IC-mounting board according to this invention;

DESCRIPTION OF THE PREFERRED EMBODIMENTS

Figure 2:
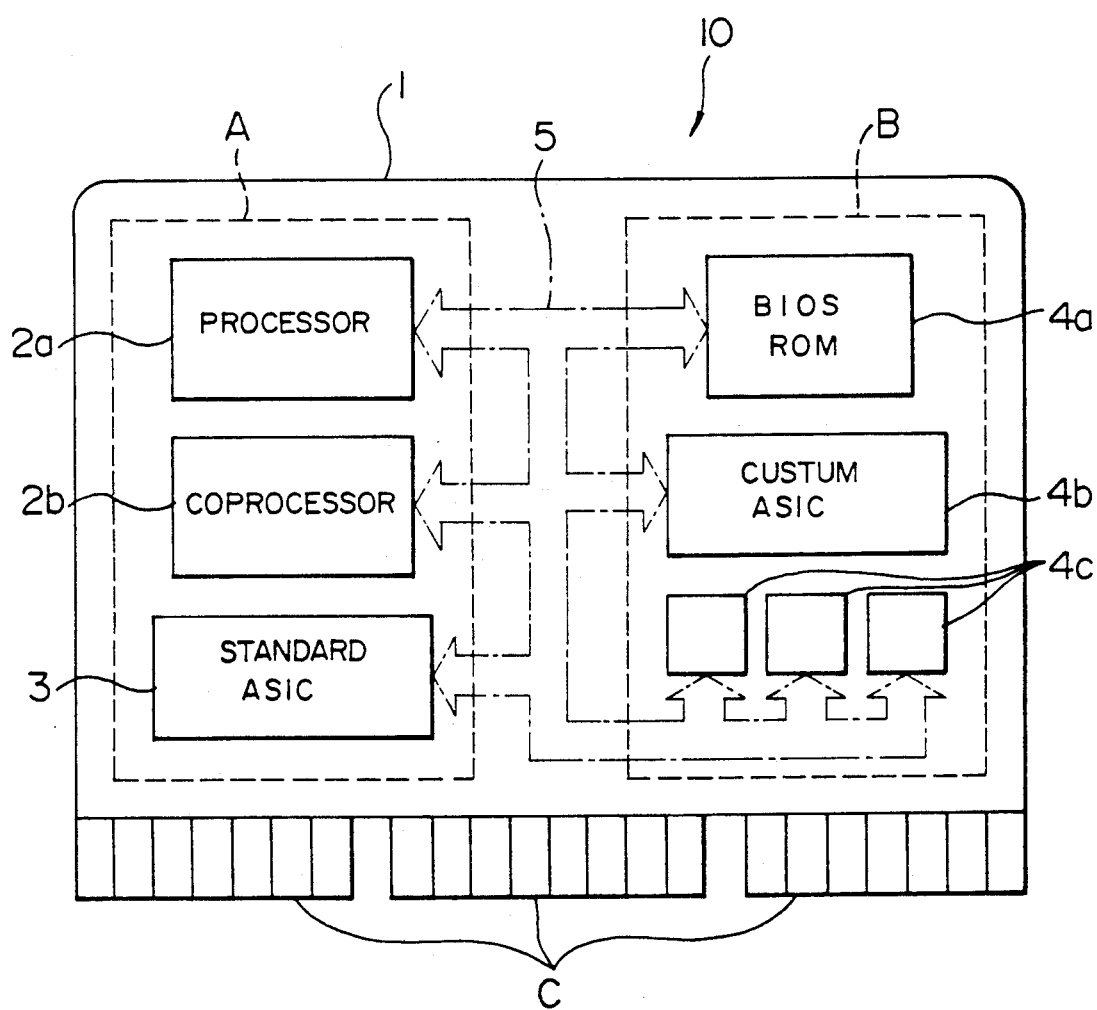
FIG. 2 is a diagram showing an arrangement of a card-type IC-mounting board according to an embodiment of this invention.

The basic arrangement of the card-type IC-mounting board according to this invention will be described with reference to FIG. 1. As shown in FIG. 1, a card-type IC-mounting board 10, which is adapted to be set detachably in a selected type of device and used to control predetermined external equipment related to the device, has a base plate 1 made of an insulating material of a specified size suitable to be set into the card slot (not shown) of the selected device. On the base plate 1, a first region A and a second region B are provided discretely in advance. The IC-mounting board 10 has a circuit structure, made up of IC elements, for execution of specified functions related to the control of the external equipment (not shown). This circuit structure is divided into a first circuit section including a microprocessor 2 and a circuit 3 for assisting the operation of the microprocessor, and a second circuit section including a control circuit 4 to control the external equipment, such as a printer and a display. The first circuit section is formed on the first region A and the second circuit section is formed on the second region B. A terminal C, used to connect the control circuit 4 with the external equipment, is fixed to the base plate.

FIG. 2 is a conceptual diagram showing the arrangement of a card-type IC-mounting board according to this invention, used for a personal computer.

As shown in FIG. 2, in a card-type IC-mounting board 10 according to this invention, there are provided on the region A, i.e. a left-half area of the base plate 1 of a credit card size, a pair of IC chips 2a and 2b constituting the microprocessor (Intel's processor 80286 and coprocessor 80287, for example), and a high-density IC chip 3, selected according to the type of the microprocessor and formed of a standard ASIC (Application Specific IC) having a single chip integrating therein peripheral circuits for assisting the basic operations of the microcomputer, such as basic bus controller, memory controller, system controller, data controller, address controller, clock generator, or various buffers. Each IC chip is an ultra-thin chip assembled by a tape automated bonding (TAB) technique and molded in a resin.

Therefore, for the circuitry of the region A (hereafter referred to as "skeleton portion") its circuit structure is invariably determined if the type of the microprocessor is determined.

On the other hand, there are provided, in this embodiment, on the region B at a right-half area of the base plate 1 (hereafter referred to as "custom section") an IC chip 4a, which is a BIOS (Basic Input Output System) ROM programmable according to its application, a high-density IC chip 4b which is a custom ASIC used as a controller of external equipment, and auxiliary IC chips which are so-called glue ICs 4c which constitute a driver of an interface with external equipment, a buffer, etc. The elements controlled by the high-density IC chip 4b include a hard disk controller, a floppy disk controller, a keyboard controller, a CRT controller, a parallel data interface, a serial data interface, and a power supply controller, for example.

The chips 2a, 2b, 3, 4a to 4c are connected by bus lines 5 such as a data bus, an address bus and a control bus.

Figure 3:
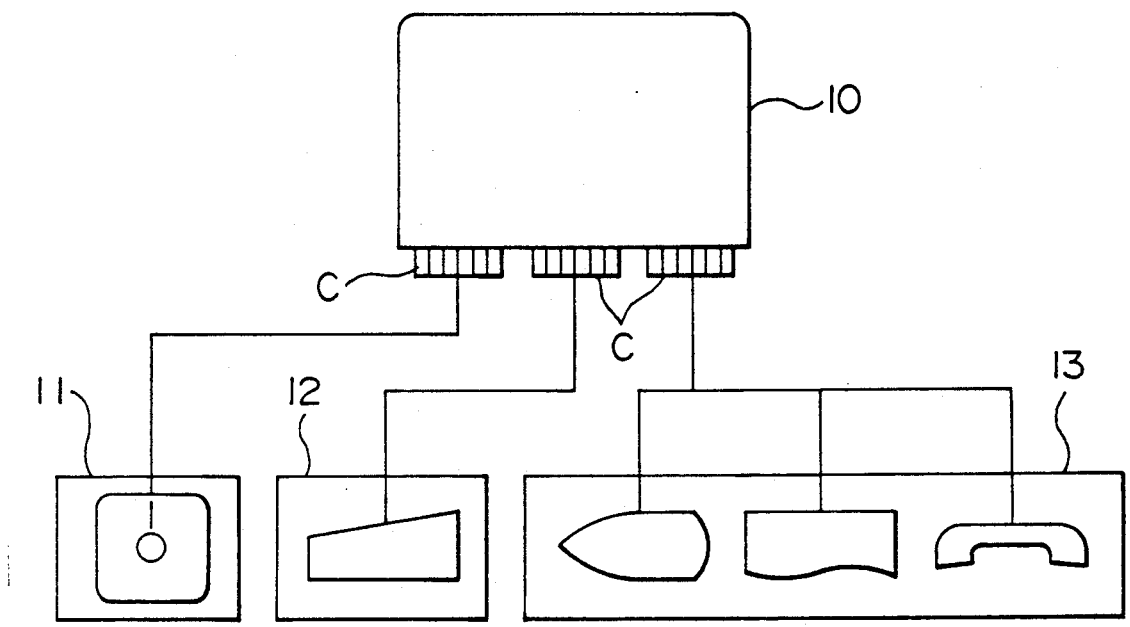
FIG. 3 is a diagram showing an example of the basic arrangement of a computer system using the card-type IC-mounting board of FIG. 2.

And, at the lower end of the base plate 1 in FIG. 3, there are provided a block of terminals C for connection with a main memory and other external equipment.

This terminal block may be omitted when signals are transmitted to and/or from the external equipment by radio waves by using a circuit such as a transponder.

FIG. 3 shows an example of the arrangement of a computer system using the card-type IC-mounting board 10 according to this invention. This case, the computer system is formed by connecting a card-type IC-mounting board 10 with a memory device 11 such as a hard disk driver (HDD), a floppy disk driver (FDD) and an IC memory card, an input device 12 such as a keyboard, and an output device 13 such as a display, a printer and a communication system.

In this embodiment, the structure of the custom ASIC 4b and the contents of a program to be stored in the BIOS ROM 4a are varied appropriately according to the type of external equipment to be connected.

In a card-type IC-mounting board 10 according to this embodiment, different kinds of card-type IC-mounting boards 10 can be produced by using various combinations of different skeleton portions A and different custom portions B. Besides a mother board for a personal computer as in this embodiment, the card-type IC-mounting board can be used as various types of expansion boards such as RAM disk modules, various types of control boards to control various communication terminals such as printers like laser printers or facsimiles, DOS-based work station boards, and so on. By using various types of card-type IC-mounting boards 10 mentioned above, the modular structure of a computer system can be achieved.

In this case, the structure of the skeleton portion A, including the standard ASIC 3 can be used commonly by various types of card-type IC-mounting boards 10, so that the skeleton portion can be produced in mass-production mode and the production cost can be reduced.

Figure 4:
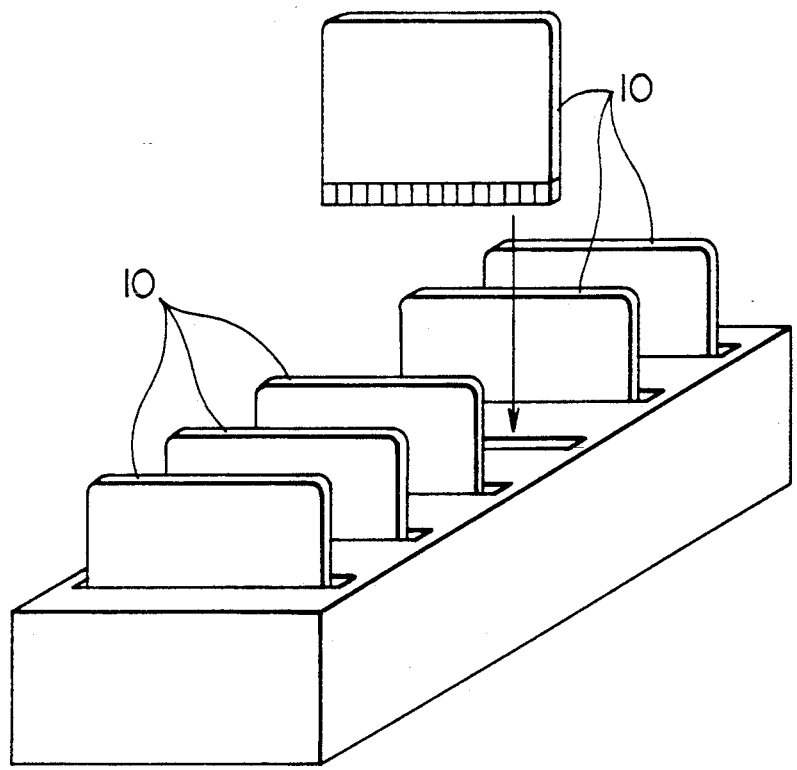
FIG. 4 is a diagram showing an example of a case in which parallel processing of data is executed by using a plurality of card-type IC-mounting boards of this invention.

As shown in FIG. 4, a plurality of card-type IC-mounting boards 10 according to this invention can be used for parallel processings. In this way, a microcomputer system can be realized for executing a relatively complicated calculation process such as image processing, for example, in a short time.

Furthermore, a card-type IC-mounting board 10 according to this invention can be used for process control. For instance, this can be done by forming an IC-card receiving slot in a working machine such as a robot and set a card-type IC-mounting board 10 in the slot to execute control required.

In a card-type IC-mounting board 10 of the present invention, it is possible to arrange necessary chips on the base plate 1 in advance and provide the user with such a board under the so-called gate array system by which the wiring and so on are designed according to the user's demand. Also, since the structure of the skeleton portion A is commonly used for various different card-type IC-mounting boards, a board formed with only the skeleton portion A on the base plate 1 may be presented to the user so that the user can freely design the custom portion B according to its use and function.

When a card-type IC-mounting board 10 of the present invention is applied to an IC card, the custom portion B may be formed by a memory device such as $E_2$ PROM and a RAM.

In a card-type IC-mounting board of the present invention, two discrete regions are provided for mounting on one of the regions a circuit section which is common to various different types of card-type IC-mounting boards other than that card-type IC-mounting board and on the other region another circuit section which is required to be designed and produced individually according to the use and functions specific to that card-type IC-mounting board so that the first circuit section can be formed by the same production line for not only a selected type of card-type IC-mounting boards, but also for other different types of card-type IC-mounting boards, resulting in high productivity and low production cost.

When it is necessary to change the design for different application and function, it is sufficient, basically, to change the design of only the second circuit section. Therefore, the design efficiency and the production efficiency are improved so that it is possible to provide an IC-mounting board with high generality in application at low cost.

In addition, if the card-type IC-mounting board is made in a credit card size specified by JIS-X6301-4 Standards, the present invention can be applied to the IC-cards widely used in the world and hence the card-type IC-mounting board of the present invention will be provided with high generality in application to many different types of equipments.

I claim:

1. A card-type IC-mounting board for being detachably set in a main device and used for controlling predetermined external equipment relating to said main device, said IC-mounting board comprising:
    a card-type base plate made of an insulating material of predetermined size;
    first and second discrete regions defined on said base plate;
    a programmable circuit section formed on said first region for controlling external equipment including said predetermined external equipment; and
    a preprogrammed circuit section formed on said second region for controlling said external equipment in cooperation with said programmable circuit.

2. A card-type IC-mounting board according to claim 1, wherein said base plate is in a form of a card of a size specified by JIS-X6301-4 standards.

3. A card-type IC-mounting board according to claim 1, further comprising a terminal section mounted on said base plate for electrical connecting said main device to said programmable circuit section and said preprogrammed circuit section.

4. A card-type IC-mounting board according to claim 2, wherein said base plate is in a form of a card of a size specified by JIS-X6301-4 standards.

5. A card-type IC-mounting board having a connecting means for connecting said IC-mounting board to predetermined external equipment, said IC-mounting board comprising:
    a substrate made of an insulating material and having a first and second region;
    a programmable circuit section formed on said first region for controlling external equipment including said predetermined external equipment and being electrically connected by said connecting means to said predetermined external equipment; and
    a preprogrammed circuit section formed on said second region for controlling said external equipment in cooperation with said programmable circuit section and being electrically connected by said connecting means to said predetermined external equipment.

6. A card-type IC-mounting board according to claim 5, wherein said substrate has a card size form specified by JIS-X63-1-4 standards.

7. A card-type IC-mounting board according to claim 5, wherein said programmable circuit section includes a microprocessor and an assisting circuit for assisting a basic operation of the microprocessor.

8. An IC-mounting board according to claim 5, wherein said pre-programmed circuit section includes:
    memory means for storing a program for controlling said predetermined external equipment;
    control means for controlling said predetermined external equipment according to said program; and
    interface means for interfacing said control means and said predetermined external equipment.

9. A card-type IC-mounting board having a connecting means for connecting said IC-mounting board to predetermined external equipment, said IC-mounting board comprising:
    a first region;
    a second region independent of said first region;
    control circuit means for controlling said predetermined external equipment when said IC-mounting board is operatively connected by said connecting means to said predetermined external equipment; said control circuit means comprising,
        a programmable circuit section formed on said first region for controlling external equipment including said predetermined external equipment; and
        a preprogrammed circuit section formed on said second region for controlling said predetermined external equipment in cooperation with said programmable circuit.

10. An IC-mounting board according to claim 9, wherein said programmable circuit section includes a microprocessor.

11. An IC-mounting board according to claim 10, wherein said pre-programmed circuit section includes:
    memory means for storing a program for controlling said predetermined external equipment;
    control means for controlling said predetermined external equipment according to said program; and
    interface means for interfacing said control means and said predetermined external equipment.

12. A card-type IC-mounting board for constituting a computer system in combination with at least one external device which serves as peripheral equipment of the computer system, said IC-mounting board comprising:
    a card-type base plate made of an insulating material of a predetermined size;
    first and second discrete regions defined on said base plate;
    a programmable IC-based first circuit section formed on said first discrete region including a microprocessor and an auxiliary circuit for assisting operations of said microprocessor;
    a pre-programed IC-based second circuit section electrically connected to said first circuit section and formed on said second discrete region, said second circuit section including a memory for storing a program to control said at least one external device; and
    means for electrically connecting said second circuit section to said at least one external device.

13. An card-type IC-mounting board according to claim 12, wherein said base plate is of card form having a size specified by JIS-X6301-4 standards.

14. An integrated circuit mounting board for constituting a computer system and operationally connected to external equipment serving as peripheral equipment of the computer system, said integrated circuit mounting board comprising:
    a substrate made of an insulating material and having first and second regions;
    a programmable first circuit structure formed on said first region and including a microprocessor and an auxiliary circuit for assisting operation of said microprocessor;

a pre-programmed second circuit structure formed on said second region and including a memory for storing a program to control said external equipment based on operation of said microprocessor.

15. An card-type IC-mounting board according to claim 3, wherein said substrate is of card form having a size specified by JIS-X6301-4 standards.

16. A computer system including a microprocessor and at least one peripheral device, said system comprising:

a card-type substrate made of an insulating material;

first and second regions defined on said substrate;

a programmable IC-based first circuit section formed on said first region and including said microprocessor;

a pre-programmed IC-based second circuit section electrically connected to said first circuit section and formed on said second region, said second circuit section serving as an interface between said microprocessor and said peripheral device; and means for electrically connecting said second circuit section to said at lease one peripheral device.

17. A computer system according to claim 8, wherein said substrate is of card form having a size specified by JIS-X6301-4 standards.

* * * * *